Patented Dec. 8, 1925.

1,564,860

UNITED STATES PATENT OFFICE.

PHILIP A. KOBER, OF HASTINGS-UPON-HUDSON, NEW YORK.

MANUFACTURE OF HYDROCHLORIDES OF 3-3'-DIAMINO-4-4'-DIOXYARSENOBENZENE.

No Drawing.   Application filed April 12, 1920.   Serial No. 373,286.

*To all whom it may concern:*

Be it known that I, PHILIP A. KOBER, a citizen of the United States, residing at Hastings-upon-Hudson, in the county of Westchester, State of New York, have invented certain new and useful Improvements in Manufacture of Hydrochlorides of 3-3'-Diamino-4-4'-Dioxyarsenobenzene; and I do hereby declare the following to be a full, clear, and exact description of the invention, such as will enable others skilled in the art to which it appertains to make and use the same.

This invention relates to improvements in the manufacture and composition of the mono-hydrochloride of diamino-dioxy-arseno-benzene, as well as to improvements in the manufacture of the dihydrochloride thereof.

Owing to the insolubility of the 3-3'-diamino-4-4'-dioxyarsenobenzene, it has been customary to convert the free base into the form of a hydrochloride for purposes of administration. The method heretofore proposed for converting the base into the hydrochloride involved dissolving the base in methyl alcohol containing hydrochloric acid, and precipitating out the hydrochloride in solid form with ether. The product so produced is referred to as the dihydrochloride of diamino-dioxyarsenobenzene or arsphenamine, but it is difficult, if not impossible, to produce a product in this way which does not contain methyl alcohol in a combined state difficult to remove. It is well known that much of the arsphenamine that has been manufactured heretofore is too toxic to meet the official requirements. This objectionable toxicity is largely due, as I believe, to the use of methyl alcohol and ether in the preparation of the dihydrochloride.

I have now found that the monohydrochloride or the dihydrochloride can be produced in a simple and advantageous manner, without the use of alcohol or ether, so that the product itself is free from methyl alcohol, either in a free or combined state. The products thus obtainable are of high purity and of high therapeutic value.

The dihydrochloride produced according to the improved process of the present invention is substantially the same in its composition and properties as the dihydrochloride of my prior application, No. 261,700, filed November 8, 1918. The monohydrochloride, produced according to the improved process of the present invention, is, as I believe, a new product, and I accordingly claim it as a part of the present invention.

The invention will be further illustrated by the following specific invention, illustrating the preferred practice.

36.6 grams of 3-3'-diamino-4-4'-dioxyarsenobenzene are suspended in 400 cc. of distilled water and dissolved in 50 cc. of twice normal caustic soda. 1000 cc. of boiling water is then added, and enough five normal hydrochloric acid is then added to the hot solution to reprecipitate all of the base. Usually about 20 cc. of the five normal hydrochloric acid is sufficient. The precipitate thus obtained is filtered and washed with distilled water. This preliminary treatment is for the purpose of purifying the base from such impurities as are contained in it, such as sulphur compounds.

The precipitate obtained as above described is 3-3'-diamino-4-4'-dioxyarsenobenzene of high purity, still admixed with the water remaining after the filtration. This press cake is agitated or beaten into a stiff cream, and there is then added about 12½ cc. of five normal hydrochloric acid, the amount of hydrochloric acid being insufficient to effect complete solution, so that a small amount of the base remains in an insoluble form, and so that any excess of hydrochloric acid over and above that required for the formation of the monohydrochloride is avoided. The resulting solution of the monohydrochloride is then filtered through cotton and is then used either for the production of the dihydrochloride, by treatment in the manner described below, or for the production of the dry monohydrochloride, by evaporating the solution under a high vacuum, for example, on the water bath at a temperature of 50 to 80° C. and at a pressure of two to ten millimetres of mercury. The monohydrochloride is thus obtained in a dry state, as a stable yellowish powder, somewhat more readily soluble in water than the dihydrochloride, but otherwise having similar properties to those of the dihydrochloride described in my prior application above referred to. The monohydrochloride is, moreover, a product of high purity and with an arsenic content approximating the theoretical. It may contain one or more molecular proportions of water if it is not completely dehydrated on drying.

If it is desired to produce the dihydrochloride, then the solution of the monohydrochloride produced as above described, after filtering off undissolved matter, and before evaporation, is treated with a further amount of five normal hydrochloric acid sufficient to convert the monohydrochloride into the dihydrochloride, care being taken to avoid any excess of hydrochloric acid. The solution of the dihydrochloride thus obtained is then evaporated to dryness under a high vacuum, in a manner similar to that above described. This dihydrochloride, as above noted, has substantially the same properties as the dihydrochloride described in my prior application, No. 261,700, above referred to.

From the foregoing description it will be seen that the process of the present invention is one of marked simplicity, and avoids entirely the use of alcohol or ether and the presence of alcohol either in a free or combined state in the final product.

I claim:

1. The method of producing a hydrochloride of 3-3'-diamino-4-4'-dioxyarsenobenzene, which comprises dissolving purified 3-3'-diamino-4-4'-dioxyarsenobenzene in hydrochloric acid, using such an amount of hydrochloric acid that no free uncombined hydrochloric acid remains, and evaporating the resulting solution to dryness under a vacuum of from about 2 to 10 mm. of mercury absolute pressure.

2. The method of producing the monohydrochloride of 3-3'-diamino-4-4'-dioxyarsenobenzene, which comprises dissolving a purified 3-3'-diamino-4-4'-dioxyarsenobenzene in hydrochloric acid, sufficient for the production of the monohydrochloride, avoiding any excess of hydrochloric acid, and evaporating the resulting solution to dryness under a high vacuum.

3. The method of producing the dihydrochloride of 3-3'-diamino-4-4'-dioxyarsenobenzene, which comprises dissolving a purified 3-3'-diamino-4-4'-dioxyarsenobenzene in hydrochloric acid, sufficient for the production of the dihydrochloride, avoiding any excess of hydrochloric acid, and evaporating the resulting solution to dryness under a vacuum of from about 2 to 10 mm. of mercury absolute pressure.

4. The method of producing the dihydrochloride of 3-3'-diamino-4-4'-dioxyarsenobenzene, which comprises dissolving a purified 3-3'-diamino-4-4'-dioxyarsenobenzene in hydrochloric acid in amount insufficient to dissolve all of the base, filtering the resulting solution, and adding thereto a further amount of hydrochloric acid to convert the monohydrochloride into the dihydrochloride, and evaporating the resulting solution to dryness under a high vacuum.

5. The method of producing a hydrochloride of 3-3'-diamino-4-4'-dioxyarsenobenzene, which comprises evaporating a solution of the hydrochloride, free from excess hydrochloric acid, to dryness under a vacuum of from 2 to 10 mm. of mercury absolute pressure.

6. As a new product, the monohydrochloride of 3-3'-diamino-4-4'-dioxyarsenobenzene, the same being a stable product free from combined alcohol, and containing approximately the theoretical arsenic content.

In testimony whereof I affix my signature.

PHILIP A. KOBER.